United States Patent

Kang

Patent Number: 5,929,587
Date of Patent: Jul. 27, 1999

[54] METHOD AND APPARATUS FOR CONTROLLING SERVOMOTOR IN TWO INERTIAL SYSTEMS

[75] Inventor: Joon Hyuk Kang, Seoul, Rep. of Korea

[73] Assignee: Samsung Electronics Co., Ltd., Suwon, Rep. of Korea

[21] Appl. No.: 09/076,067

[22] Filed: May 12, 1998

[30] Foreign Application Priority Data

May 12, 1997 [KR] Rep. of Korea ............. 97-18347

[51] Int. Cl.⁶ ........................... G05B 5/01
[52] U.S. Cl. ............. 318/623; 318/611; 318/632
[58] Field of Search ............. 318/563, 568.22, 318/568.24, 611, 623, 630, 632

[56] References Cited

U.S. PATENT DOCUMENTS

| | | | |
|---|---|---|---|
| 5,650,704 | 7/1997 | Pratt et al. | 318/623 |
| 5,719,479 | 2/1998 | Kato et al. | 318/563 |
| 5,736,797 | 4/1998 | Motohashi et al. | 310/36 |
| 5,742,144 | 4/1998 | Kato et al. | 318/630 |

*Primary Examiner*—Bentsu Ro
*Attorney, Agent, or Firm*—Burns, Doane, Swecker & Mathis, L.L.P.

[57] ABSTRACT

A servomotor controlling method and apparatus for use in two inertial systems in which the servomotor and a load are mutually connected by an elastic connection element is provided. A compensation torque value for suppressing oscillation is obtained on the basis of a torque command value for the servomotor and a motor output velocity. The compensation torque value is reflected on the torque command value to then be provided to the servomotor. Accordingly, a resilient torsional torque generated between a driving inertial system and a driven inertial system is properly corrected to thereby suppress oscillation and improve system stability.

12 Claims, 4 Drawing Sheets

METHOD AND APPARATUS FOR CONTROLLING SERVOMOTOR IN TWO INERTIAL SYSTEMS

BACKGROUND OF THE INVENTION

1. Field of the Invention

The present invention relates to a method and an apparatus for controlling a servomotor and more particularly, to a method and an apparatus for controlling a servomotor in two inertial systems in which the servomotor and a load is mutually connected via an elastic connection element.

2. Description of the Related Art

In a flexible joint of a robot, a flexible arm, a universal structure and the like, a load and a servomotor for driving the load are connected via an elastic shaft, and form what is called two inertial systems. FIG. 1 schematically illustrates such two inertial systems. As shown in FIG. 1, a driving inertial system 3 at the side of a servomotor and a driven inertial system 5 at the side of a load are connected via an elastic connection element 7. In the drawing, symbols $\omega$, $\theta$, $T_e$ and J denote a velocity, a position, a torque command value and an inertial moment of the driving inertial system 3, respectively. Symbols $\omega_L$, $\theta_L$, $T_L$ and $J_L$ denote a velocity, a position, a disturbance torque and an inertial moment of the driven inertial system 5, respectively. A character K is a spring constant of the elastic connection element 7.

FIG. 2 is a block diagram showing a dynamic model of the two inertial systems of FIG. 1. The driving inertial system 3 outputs an output velocity a) according to a torque command value $T_e$. Accordingly, the driven inertial system 5 produces a load velocity $\omega_L$. Here, there are inevitably a difference $(\omega-\omega_L)$ between the velocities and a difference $(\theta-\theta_L)$ between the positions in the two inertial systems, the driving inertial system 3 and the driven inertial system 5 due to elasticity of the elastic connection element 7 via which the driving and driven inertial systems are connected each other. The differences between the velocities/positions become severe during abrupt acceleration and deceleration. The positional difference $(\theta-_L)$ between the driving inertial system 3 and the driven inertial system 5 generates a resilient torsional torque, that is, $T_T=K(\theta-\theta_L)$ As shown in FIG. 2, the resilient torsional torque $T_T$ acts on the driving inertial system 3 together with the torque command value $T_e$, and thus affects the driving inertial system 3, that is, an output velocity of a servomotor. The resilient torsional torque $T_T$ also acts on the driven inertial system 5 together with the disturbance torque $T_L$, and thus affects the driven inertial system 5, that is, a velocity of a load. Such an effect of the resilient torsional torque $T_T$ does not only lower stability in controlling of the system, but also generates a torsional vibration, to thereby further deteriorate stability of the system.

FIG. 3 is a block diagram showing an example of a conventional control apparatus for the two inertial systems. As shown in FIG. 3, the conventional control apparatus includes a PI (proportion and integration) controller 9 which produces a torque command value $T_e$, for the driving inertial system 3, that is the servomotor. An output velocity $\omega$ of the driving inertial system 3 is feedback to a subtracter 1 provided in the preceding end of the PI controller 9. The subtracter 9 outputs a target velocity of the driven inertial system a, that is, an error value between a load velocity command value $\omega^*$ and the output velocity $\omega$ of the driving inertial system 3, to the PI controller 9. The PI controller 9 operates to produce a torque command value $T_e$ for having an error between the load velocity command value $\omega^*$ and the motor output velocity $\omega$ be access to zero as closely as possible. Since the motor output velocity $\omega$ reflects the effect of the resilient torsional torque $T_T$ by the elastic connection element 7, the PI controller 9 can reduce the effect of the resilient torsional torque $T_T$ during normal operation of the servo system.

However, during abrupt acceleration and deceleration, the resilient torsional torque $T_T$ acts on the driving inertial system 3 and the driven inertial system 5 alternatively, that is, in the form of vibration, and a amount of the position/velocity differences between the driving inertial system 3 and the driven inertial system 5 occurs, the PI controller 9 is limited to appropriately cope with the above occurrence. Thus, the occurrence of the vibration and the lowering of the system stability cannot be effectively prevented by using only the PI controller 9 in the two inertial systems.

SUMMARY OF THE INVENTION

To solve the above problems, it is an object of the present invention to provide a method and an apparatus for controlling a servomotor in two inertial systems, by which a resilient torsional torque generated between a driving inertial system and a driven inertial system both of which are connected via an elastic connection element is appropriately amended to thereby suppress a vibration and heighten stability of the system.

To achieve the above object of the present invention, there is provided a method for controlling a servomotor in two inertial systems in which the servomotor and a load are mutually connected via an elastic connection element, the method comprising the steps of: obtaining a torque command value to the servomotor on the basis of a load velocity command value; detecting a motor output velocity of the servomotor; obtaining a compensation torque value for suppressing a vibration on the basis of the torque command value and the motor output velocity; and reflecting the compensation torque value on the torque command value to thereby provide the reflected result to the servomotor.

Here, it is preferable that the step of obtaining the compensation torque value comprises the steps of: estimating an acceleration of the load; obtaining a differential value of the load acceleration from the estimated value of the load acceleration; and obtaining the compensation torque value by multiplying the differential value of the load acceleration by a compensation feedback gain.

The step of estimating the load acceleration comprises a state observing step of estimating a resilient torsional torque in the elastic connection element and a disturbance torque for the servomotor on the basis of the motor output velocity and the torque command value, and a step of obtaining the estimated value of the load acceleration on the basis of an error value between the estimated value of the resilient torsional torque and the estimated value of the disturbance torque.

The estimated value of the load acceleration can be expressed by the following equation:

$$\hat{\omega}_L = \frac{1}{J_L}[\hat{T}_T - \hat{T}_L]$$

wherein, $\hat{\omega}_L$ is the estimated value of the load acceleration, $\hat{T}_T$ is the estimated value of the resilient torsional torque, $\hat{T}_L$ is the estimated value of the disturbance torque, and $J_L$ is the inertial moment of the load.

Preferably, the finally compensated torque command value $T_c$ is calculated according to the following equation:

$$T_c = K_p(\omega^* - \hat{\omega}) + K_I\int(\omega^* - \hat{\omega})dt - K_L\hat{\omega}_L$$

in which $\omega^*$ is the load velocity command value, $\hat{\omega}$ is the observed motor output velocity, $\hat{\omega}$ is the differential value of the load acceleration $K_P$ is the velocity proportional gain, $K_I$, is the integration gain and $K_L$ is the compensation feedback gain.

According to another embodiment of the present invention, there is provided a method for controlling a servomotor in two inertial systems in which the servomotor and a load are connected via an elastic connection element, the method comprising the steps of: obtaining a torque command value the servomotor on the basis of a load velocity command value; detecting a motor output velocity of the servomotor; estimating a resilient torsional torque in the elastic connection element and a disturbance torque for the servomotor on the basis of the torque command value and the motor output velocity; obtaining the estimated value of the load acceleration on the basis of a difference value between the estimated value of the resilient torsional torque and the estimated value of the disturbance torque; obtaining a differential value of the load acceleration from the estimated value of the load acceleration; obtaining a compensation torque value for suppressing a vibration by multiplying the differential value of the load acceleration by a compensation feedback gain; and reflecting the compensation torque value on the torque command value to thereby provide the reflected result to the servomotor.

According to another aspect of the present invention, there is also provided an apparatus for controlling a servomotor in two inertial systems in which the servomotor and a load are mutually connected via an elastic connection element, the apparatus comprising: a state observer for estimating a resilient torsional torque in the elastic connection element and a disturbance torque for the servomotor on the basis of a torque command value for the servomotor and a motor output velocity of the servomotor; a compensation torque calculator for calculating a compensation torque value for suppressing a vibration on the basis of a difference value between the estimated value of the resilient torsional torque and the estimated value of the disturbance torque; and a subtracter for subtracting the compensation torque value from the torque command value to thereby provide the subtraction result to the servomotor.

BRIEF DESCRIPTION OF THE DRAWINGS

The above object and advantages of the present invention will be apparent by describing the structure and operation thereof in detail with reference to the attached drawings in which.

DETAILED DESCRIPTION OF THE INVENTION

Figure 1:
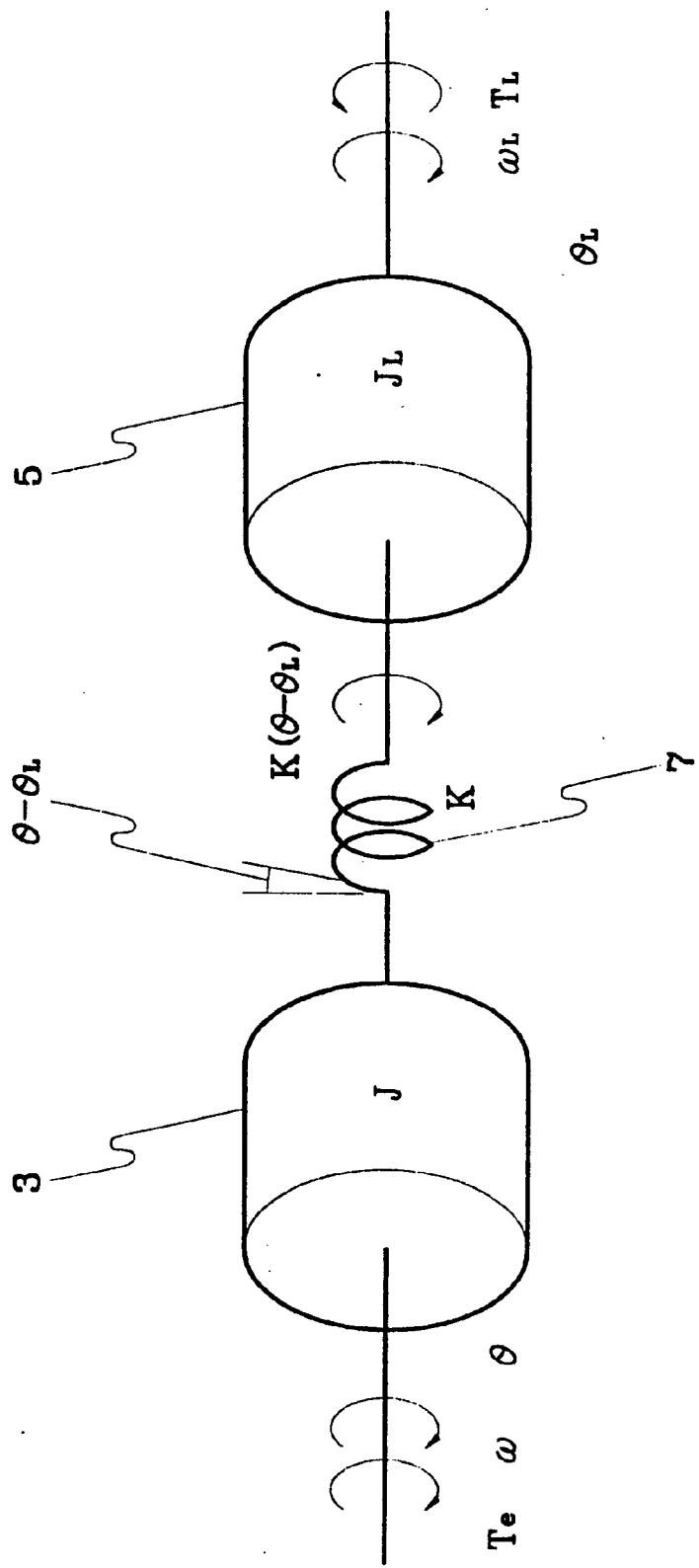
FIG. 1 is a schematic diagram of two inertial systems.
Figure 2:
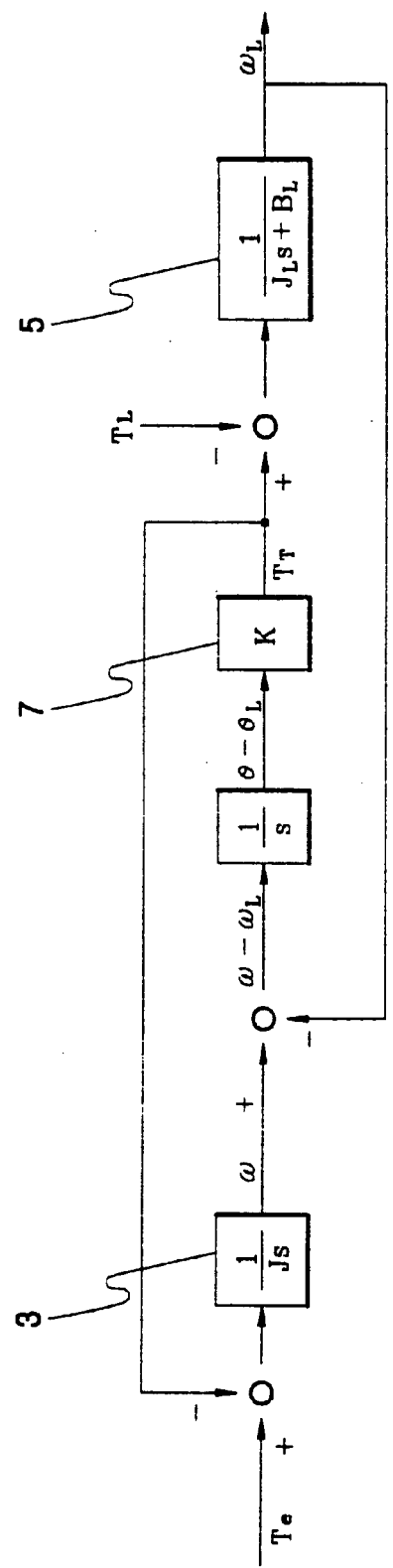
FIG. 2 is a block diagram of a dynamic model in the two inertial systems.
Figure 3:
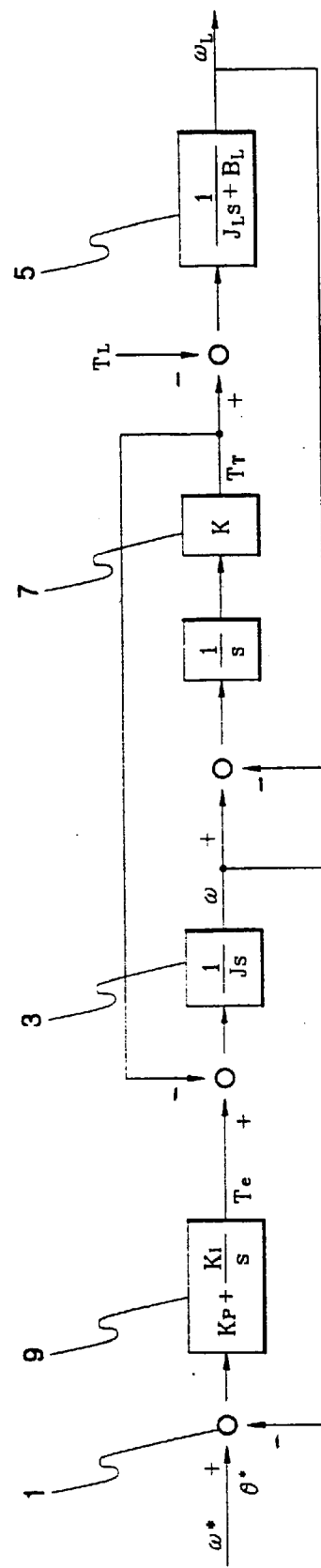
FIG. 3 is a block diagram of an example of a conventional control apparatus for controlling a servomotor.
Figure 4:
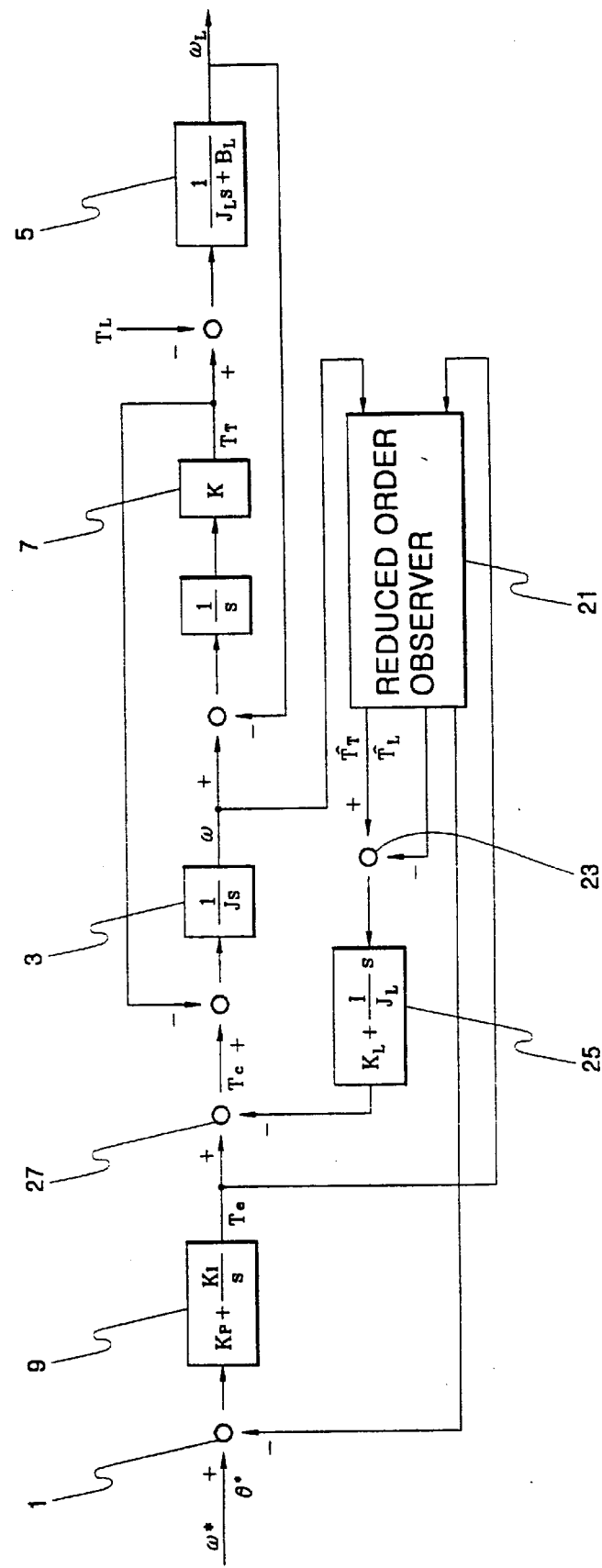
FIG. 4 is a block diagram of an apparatus for controlling a servomotor in two inertial systems according to the present invention.

A preferred embodiment of the present invention will be described in detail with reference to FIG. 4, in which description of the same elements as those described with reference to FIGS. 1 through 3 will be omitted. As shown in FIG. 4, an apparatus for controlling a servomotor includes a driving inertial system 3 comprised of a servomotor, a driven inertial system 5 on the load side, and an elastic connection element 7 for elastically connecting the driving inertial system 3 and the driven inertial system 5. The controlling apparatus according to the present invention includes a PI controller 9 for producing a torque command value $T_e$ to thereby provide the produced result to the driving inertial system 3, a reduced order observer 21 being a state observer for estimating a resilient torsional torque of the elastic connection element 7 and a disturbance torque of the driven inertial system 5 on the basis of the torque command value $T_e$ and motor output velocity $\omega$, and a compensation torque value calculator 25 for calculating a compensation torque value from the estimated value of the resilient torsional torque and the estimated value of the disturbance torque.

The motor output velocity observed by the reduced order observer 21 is feedback to a subtracter 1 provided in the preceding end of the PI controller 9. The subtracter 1 outputs a difference value between the load velocity command value and the motor output value to the PI controller 9. The estimated value of the resilient torsional torque estimated in the reduced order observer 21 and the estimated value of the disturbance torque are supplied to a subtracter 23. The subtracter 23 outputs a difference value between the estimated values of both the resilient torsional torque and the disturbance torque to a compensation torque calculator 25. The compensation torque calculator 25 obtains an estimated value of the driven inertial system 5, that is, an estimated value of the acceleration of the load using the difference value of both the estimated values, and differentiates the estimated value of the acceleration to obtain a differential value of the load acceleration. Then, the compensation torque calculator 25 multiplies the differential value by the compensation torque feedback gain to obtain a compensation torque value. The compensation torque value is supplied to a subtracter 27 provided between the PI controller 9 and the driving inertial system 3, corrects the torque command value produced in the PI controller 9, and provides the corrected result to the driving inertial system 3.

Hereinafter, the estimation of the resilient torsional torque and the disturbance torque in the reduced order observer 21 and the calculation of the compensation torque value in the compensation torque calculator 25 will be described in more detail.

It is considered that a state equation of two inertial systems is made using state variables such as a load velocity $\omega_L$, a disturbance torque $T_L$, a motor output velocity $\omega$ and a resilient torsional torque $T_T$. Here, it is assumed that the disturbance torque $T_L$, is constant with respect to time, and the torque command value $T_e$ and the detected motor output velocity $\omega$ are input variables of the disturbance torque $T_L$. Here, J is the inertial moment of the driving inertial system 3, $J_L$ is the inertial moment of the driven inertial system 5, K is the spring constant of the elastic connection element 7. Thus, the state equation of the two inertial systems can be expressed as the following equation (1).

$$x = Ax + Bu, \quad y = C^T x \tag{1}$$

Here, $$A = \begin{bmatrix} 0 & -\frac{K}{J_L} & -\frac{1}{J_L} & 0 \\ 0 & 0 & 0 & 0 \\ -K & 0 & 0 & K \\ 0 & 0 & -\frac{1}{J} & 0 \end{bmatrix}, x = \begin{bmatrix} \omega_L \\ T_L \\ T_T \\ \omega \end{bmatrix}, B = \begin{bmatrix} 0 \\ 0 \\ 0 \\ -\frac{1}{J} \end{bmatrix}, u = T_e \tag{2}$$

$$y = \omega, \quad C^T = [0\,0\,0\,1] \tag{3}$$

To construct the reduced order observer, the state equation of the above equation (1) can he divided as the following equation (4).

$$\begin{bmatrix} \dot{x}_r \\ \dot{x}_n \end{bmatrix} = \begin{bmatrix} A_r & b_r \\ c_r & a_{nn} \end{bmatrix} \begin{bmatrix} x_r \\ x_n \end{bmatrix} + \begin{bmatrix} g_r \\ g_n \end{bmatrix} \quad (4)$$

Here, $x_r=[\omega_L\ T_L\ T_T]$, $x_n=\omega$, $b_r=[0\ 0\ K]^T$, $c_r=[0\ 0\ -J^{-1}]$, $a_{mn}=0$, $g_r=[0\ 0\ 0]^T \cdot g_n = 1$, and $$A_r = \begin{bmatrix} -B_L J_L^{-1} & -J_L^{-1} & J_L^{-1} \\ 0 & 0 & 0 \\ -K & 0 & 0 \end{bmatrix}.$$

Here, the reduced order observer, provided in the present invention can be expressed as the following equation (5).

$\dot{z}=(A_r-l_r c_r)z+(b_r-l_r a_{nn}+A_r l_r-l_r c_r l_r)y+(g_r-l_r g_n)u$ $\hat{x}_r=z+l_r y$ $\hat{x}_n=x_n=y$ \quad (5)

Here, $\hat{x}_r$ is an estimation status, $l_r$ is an observer gain matrix, and z is an auxiliary vector, which are defined as the following equation (6).

$\hat{x}_r=[\hat{\omega}_L\ \hat{T}_L\ \hat{T}_T]^T$, $L_r=[l_1\ l_2\ l_3]$, $z=[z_1\ z_2\ z_3]$ \quad (6)

Now, the equation (5) can be expressed as the following equation (7). In this case, since $B_L$ is extremely small, it is ignored.

$$\dot{z} = \begin{bmatrix} 0 & -J_L^{-1} & J_L^{-1}+J^{-1}l_1 \\ 0 & 0 & J^{-1}l_2 \\ -K & 0 & J^{-1}l_3 \end{bmatrix} z +$$

$$\begin{bmatrix} J_L^{-1}(l_2+l_3)+J^{-1}l_1 l_2 \\ J^{-1}l_2 l_3 \\ K(1-l_1)+J^{-1}l_3 \end{bmatrix} y + \begin{bmatrix} J^{-1}l_1 \\ J^{-1}l_2 \\ J^{-1}l_3 \end{bmatrix} u$$

$$\hat{x}_r = z + \begin{bmatrix} l_1 \\ l_2 \\ l_3 \end{bmatrix} = y$$

$\hat{x}_n = x_n = y$

Here, to set the observer gain matrix $l_r$, a characteristic polynomial $\Delta(s)$ of a matrix $A-l_r c^T$ expressed as the following equation (8) is obtained.

$\Delta(s)=[sI-A_r+l_r c_r]=s^3-l_3 J^{-1}s^2+(Kl_1 J^{-1}+KJ_L^{-1})s-Kl_2 J^{-1}J_L^{-1}$ \quad (8)

Here, the observer gain is set in such a manner that the above characteristic polynomial $\Delta(s)$ has a triple root $s=-\lambda$ wherein $\lambda>0$. To do so, the following equation (9) should be met.

$\Delta(s)=(s+\lambda)^3=s^3+3\lambda s^2+3\lambda^2 s+\lambda^3$ \quad (9)

The observer gain matrix is given the following equation (10) according to the equations (8) and (9).

$$l_1 = K^{-1}(3\lambda^2 - KJ_L^{-1})J, \quad l_2 = -\frac{\lambda^3 J_L J}{K}, \quad l_3 = -3\lambda J \quad (10)$$

Now, using the estimated value of the resilient torsional torque $\hat{T}_T$ and the estimated value of the disturbance torque both of which are calculated from the equation (7), the estimated value $\hat{\omega}_L$ of the load acceleration of the driven inertial system 5 can be obtained in the equation (1). The obtained estimated value $\hat{\omega}_L$ of the load acceleration is expressed as the following equation (11).

$$\hat{\omega}_L = \frac{1}{J_L}[\hat{T}_T - \hat{T}_L] \quad (11)$$

The compensation torque calculator 25 differentiates the estimated value of the load acceleration of the equation (11), and simultaneously multiplies the differentiated result by the compensation feedback gain, to then be supplied to the subtracter 27. The subtracter 27 provides an error between the torque command value $T_e$ being the output of the PI controller 9 and the compensation torque value of the compensation torque calculator 25 to the driving inertial system 3. That is, the finally compensated control input value provided to the driving inertial system 3 is expressed as the following equation (12).

$T_c=T_e-K_L\ \hat{\omega}_L=K_P(\omega^*-\hat{\omega})+K_I\int(\omega^*-\hat{\omega})dt-K_L\ \hat{\omega}_L$ \quad (12)

Here, $K_P$ is a velocity proportion gain, $K_I$ is an integration gain, and $K_L$ is a compensation feedback gain.

Here, a PI control component including a velocity error expressed as the $(\omega^*-\hat{\omega})$ of the equation (12) plays a role of attenuating a high-frequency oscillation due to an error in the velocity calculation. The compensation torque value expressed as $-K_L\ \hat{\omega}_L$ plays a role of attenuating an oscillation phenomenon due to the disturbance torque and the resilient torsional torque.

As described above, the present invention obtains an estimated value of an acceleration of a driven inertial system in two inertial systems, calculates a compensation torque value, and corrects a torque command value using the compensation torque value. As a result, a resilient torsional torque due to an elastic connection element is appropriately removed to thereby remove oscillation and improve system stability.

What is claimed is:

1. A method for controlling a servomotor in two inertial systems in which the servomotor and a load are mutually connected via an elastic connection element, the servomotor controlling method comprising the steps of:

obtaining a torque command value for the servomotor on the basis of a load velocity command value;

detecting a motor output velocity of the servomotor;

obtaining a compensation torque value for suppressing a vibration on the basis of the torque command value and the motor output velocity; and reflecting the compensation torque value on the torque command value to thereby provide the reflected result to the servomotor.

2. The servomotor controlling method according to claim 1, wherein the step of obtaining the compensation torque value comprises the steps of:

estimating an acceleration of the load;

obtaining a load acceleration differential value from the estimated value of the load acceleration; and obtaining the compensation torque value by multiplying the load acceleration differential value by a compensation feedback gain.

3. The servomotor controlling method according to claim 2, wherein the step of estimating the load acceleration comprises:

a state observing step of estimating a resilient torsional torque in the elastic connection element and a disturbance torque for the servomotor on the basis of the motor output velocity and the torque command value; and a step of obtaining the estimated value of the load acceleration on the basis of an error value between the estimated value of the resilient torsional torque and the estimated value of the disturbance torque.

4. The servomotor controlling method according to claim 3, wherein the estimated value of the load acceleration can be expressed by the following equation:

$$\hat{\omega}_L = \frac{1}{J_L}[\hat{T}_T - \hat{T}_L]$$

in which $\hat{\omega}_L$ is the estimated value of the load acceleration, $\hat{T}_T$ is the estimated value of the resilient torsional torque, $\hat{T}_L$ is the estimated value of the disturbance torque, and $J_L$ is the inertial moment of the load.

5. The servomotor controlling method according to claim 4, wherein the finally compensated torque command value $T_c$ is calculated according to the following equation:

$$T_c=T_e-K_L\hat{\omega}_L=K_P(\omega^*-\hat{\omega})+K_I\int(\omega^*-\hat{\omega})dt-K_L\hat{\omega}$$

in which $\omega^*$ is the load velocity command value, $\hat{\omega}$ is the observed motor output velocity, $\hat{\omega}$ is the differential value of the load acceleration, $K_P$ is the velocity proportional gain, $K_I$ is the integration gain and $K_L$ is the compensation feedback gain.

6. A method for controlling a servomotor in two inertial systems in which the servomotor and a load are mutually connected via an elastic connection element, the servomotor controlling method comprising the steps of:

obtaining a torque command value for the servomotor on the basis of a load velocity command value;

detecting a motor output velocity of the servomotor;

estimating a resilient torsional torque in the elastic connection element and a disturbance torque for the servomotor on the basis of the torque command value and the motor output velocity;

obtaining the estimated value of the load acceleration on the basis of a difference value between the estimated value of the resilient torsional torque and the estimated value of the disturbance torque;

obtaining a differential value of the load acceleration from the estimated value of the load acceleration;

obtaining a compensation torque value for suppressing a vibration by multiplying the differential value of the load acceleration by the compensation feedback gain; and reflecting the compensation torque value on the torque command value to thereby provide the reflected result to the servomotor.

7. The servomotor controlling method according to claim 6, wherein the estimated value of the load acceleration can be expressed by the following equation:

$$\hat{\omega}_L = \frac{1}{J_L}[\hat{T}_T - \hat{T}_L]$$

in which $\hat{\omega}_L$ is the estimated value of the load acceleration, $\hat{T}_T$ is the estimated value of the resilient torsional torque, $\hat{T}_L$ is the estimated value of the disturbance torque, and $J_L$ is the inertial moment of the load.

8. The servomotor controlling method according to claim 7, wherein the finally compensated torque command value $T_c$ is calculated according to the following equation:

$$T_c=T_e-K_L\hat{\omega}_L=K_P(\omega^*-\hat{\omega})+K_I\int(\omega^*-\hat{\omega})dt-K_L\hat{\omega}$$

in which $\omega^*$ is the load velocity command value, $\hat{\omega}$ is the observed motor output velocity, $\hat{\omega}$ is the differential value of the load acceleration $K_P$ is the velocity proportional gain, $K_I$ is the integration gain and $K_L$ is the compensation feedback gain.

9. An apparatus for controlling a servomotor in two inertial systems in which the servomotor and a load are mutually connected via an elastic connection element, the servomotor controlling apparatus:

a state observer for estimating a resilient torsional torque in the elastic connection element and a disturbance torque for the servomotor, on the basis of a torque command value for the servomotor based on a load velocity command value and a motor output velocity of the servomotor;

a compensation torque calculator for calculating a compensation torque value for suppressing a vibration on the basis of a difference value between the estimated value of the resilient torsional torque and the estimated value of the disturbance torque; and a subtracter for subtracting the compensation torque value from the torque command value to thereby provide the subtraction result to the servomotor.

10. The servomotor controlling apparatus according to claim 9, wherein the compensation torque calculator obtains the estimated value of the load acceleration on a difference value between the estimated value of the resilient torsional torque and the estimated value of the disturbance torque, to thereby obtain a differential value of the estimated value of the load acceleration, and calculates the compensation torque value by multiplying the load acceleration differentialvalue by a compensation feedback gain.

11. The servomotor controlling apparatus according to claim 10, wherein the estimated value of the load acceleration can be expressed by the following equation:

$$\hat{\omega}_L = \frac{1}{J_L}[\hat{T}_T - \hat{T}_L]$$

in which $\hat{\omega}_L$ is the estimated value of the load acceleration, $\hat{T}_T$ is the estimated value of the resilient torsional torque, $\hat{T}_L$ is the estimated value of the disturbance torque, and $J_L$ is the inertial moment of the load.

12. The servomotor controlling apparatus according to claim 11, wherein the finally compensated torque command value $T_c$ is calculated according to the following equation:

$$T_c=T_e-K_L\hat{\omega}_L=K_P(\omega^*-\hat{\omega})+K_I\int(\omega^*-\hat{\omega})dt-K_L\hat{\omega}_L$$

in which $\omega^*$ is the load velocity command value, $\hat{\omega}$ is the observed motor output velocity, $\hat{\omega}$ is the differential value of the load acceleration, $K_P$ is the velocity proportional gain, $K_I$ is the integration gain and $K_L$ is the compensation feedback gain.

* * * * *